United States Patent [19]
Motoyama

[11] Patent Number: 6,078,931
[45] Date of Patent: Jun. 20, 2000

[54] METHOD AND SYSTEM FOR RESETTING REFERENCES TO DELETED SOFTWARE STRUCTURES

[75] Inventor: Tetsuro Motoyama, Cupertino, Calif.

[73] Assignees: Ricoh Company, Ltd., Tokyo, Japan; Ricoh Corporation, San Jose, Calif.

[21] Appl. No.: 09/007,100

[22] Filed: Jan. 14, 1998

[51] Int. Cl.$^7$ .................................................. G06F 9/44
[52] U.S. Cl. ........................ 707/203; 707/103; 395/712
[58] Field of Search .................................. 707/203, 103, 707/10; 395/712

[56] References Cited

U.S. PATENT DOCUMENTS

| | | | |
|---|---|---|---|
| 5,495,610 | 2/1996 | Shing et al. | 709/221 |
| 5,752,042 | 5/1998 | Cole et al. | 395/712 |
| 5,761,504 | 6/1998 | Corrigan et al. | 713/2 |
| 5,835,911 | 11/1998 | Nakagawa et al. | 707/203 |
| 5,837,986 | 11/1998 | Barile et al. | 235/487 |
| 5,909,581 | 6/1999 | Park | 395/712 |
| 5,933,647 | 8/1999 | Aronberg et al. | 395/712 |
| 5,983,239 | 11/1999 | Cannon | 707/200 |

OTHER PUBLICATIONS

Meyers, S., More Effective C++, Addison Wesley Longman, Inc., Massachusetts, 1996, (pp. 183–213).

*Primary Examiner*—Jean R. Homere
*Attorney, Agent, or Firm*—Oblon, Spivak, McClelland, Maier & Neustadt, P.C.

[57] ABSTRACT

A method, system, computer program product, memory, and object-oriented system for resetting references to software structures after the software structures have been deleted. A software structure to be referenced or used by plural users in the same or different modules is created having an array or list of references to users, initialized to reflect no current users of the software structure. A user software structure is created having a reference pointer, or pointer variable, initialized to reflect no current referenced software structure. When the user software structure requests a reference to the referenced software structure, the reference pointer of the user software structure is assigned the value of the reference to the used software structure. The user software structure is registered with the used software structure by inserting a reference to the user software structure in the array, or list of users in the used software structure. When a user software structure relinquishes reference to the used software structure, the reference pointer of the user software structure is used to reference the used software structure. The array of users is accessed to delete the reference to the user software structure which is relinquishing reference to the used software structure, thereby unregistering the user software structure. The reference pointer of the user software structure is set to zero or null to reflect no current reference for the user software structure.

50 Claims, 11 Drawing Sheets

METHOD AND SYSTEM FOR RESETTING REFERENCES TO DELETED SOFTWARE STRUCTURES

CROSS-REFERENCES TO RELATED APPLICATIONS

This application is related to three commonly owned co-pending patent applications: U.S. patent application Ser. No. 08/997,707, entitled "Method and Apparatus For Mapping Structured Information to Different Structured Information," U.S. patent application Ser. No. 08/997,482, entitled "Object-Oriented System and Computer Program Product For Mapping Structured Information to Different Structured Information," and U.S. patent application Ser. No. 08/997,705, entitled "Method and Apparatus For Providing a Graphical User Interface For Creating and Editing a Mapping of a First Structural Description to a Second Structural Description," each filed on Dec. 23, 1997, and incorporated herein by reference.

BACKGROUND OF THE INVENTION

1. Field of the Invention

This invention relates generally to managing references to software structures. The present invention relates more specifically to resetting references to software structures after the software structures have been deleted. The invention is more specifically related to providing a registry of references to a software structure for ease of update of the references when the referenced software structure is deleted. The invention is also related to providing a registry of references to a software object for ease of update of the references when the referenced software object is deleted. The invention is further related to a method, system, computer program product, memory, and object-oriented system for providing a registry of users of a software object for ease of updating the users when the referenced software object is deleted.

2. Discussion of the Background

Object Oriented Programming ("OOP") is a programming methodology in which a program is viewed as a collection of discrete objects that are self-contained collections of data structures and routines that interact with other objects. Many high-level languages, including C++, support the declaration of a class. The class is typically a template or detailed description of the objects or instances of objects which will be created or instantiated by a constructor function during program execution and destroyed by a destructor function when the object is no longer needed. A conversational reference to a class includes all of the objects currently in existence as a result of constructor calls. A class is made up of data items, structures, and methods. Data items correspond to variables of prior programming art. Structures are named groupings of related data items and other structures. Methods correspond to functions and subroutines of prior programming art.

An object-oriented framework is a reusable basic design structure, having abstract and concrete classes, that assists in building applications.

The three main features of object oriented programming are inheritance, encapsulation, and polymorphism. Inheritance allows a programmer to establish a general class, or a base class, with features which are desirable for a wide range of objects. For example, if a programmer designs a class polygon having certain features such as a closed convex shape made up of plural straight lines joined pairwise at vertices, it is then possible to construct polygon subclasses such as triangles, quadrilaterals, pentagons, and hexagons, all having the shared properties of the parent class polygon, with additional constraints on the number of sides to be allowed for the objects generated. It is also possible, for example, to have subclasses of class quadrilateral such as rectangle and rhombus. The class polygon is considered a base class, in that instantiations of actual objects is performed in its subclasses. However, the class polygon establishes certain properties inherent to all of the subclasses for inheritance purposes.

Encapsulation and polymorphism have already been described, and are already well known, in patents relating to object-oriented systems. A comprehensive discussion of OOP is provided in Coad, P. and Yourdon, E., *Object-Oriented Analysis*, Second Edition, Prentice-Hall, Inc., New Jersey, 1991, and in Booch, G., *Object-Oriented Analysis and Design with Applications*, Second Edition, Addison Wesley Longman, California, 1994, which are incorporated herein by reference.

A string variable or a string literal is a data structure composed of a sequence of characters of the character set of a particular application. A null string, a nil string, or an empty string is a string which contains no characters.

Pointers and references in programming languages are data items having values that are equivalent to absolute computer memory addresses. In many high-level programming languages, pointers are used to hold addresses of the first addressable unit of dynamically allocated computer memory. Computer memory is dynamically allocated for both data and instructions during compilation, loading, and execution of a program. For this invention, a software structure is an addressable collection of one or more software elements comprising data and/or instructions. Individual elements of a software structure are stored contiguously in some implementations, or are alternatively stored in non-contiguous storage locations, with references used to access the individual elements.

If plural pointers, for example, have their values set to reference a particular instance of a software structure, and the software structure is deleted, the pointers typically no longer reference valid data or instructions for the current application. Applications typically are partitioned to have plural modules having interfaces for inter-module communication. For this invention, a module is a collection of routines and/or data structures that performs a particular task or implements a particular abstract data type. If the exemplary plural pointers discussed above exist in different modules, it is difficult to examine the pointers for validity before use. Use of a pointer that is no longer valid, for example, as a result of deletion of the referenced software structure, frequently causes a computer system crash.

A reference counting technique in the related art involves allocation of storage for a numeric counter value with a reference to a newly allocated software structure whenever a software structure is requested which allows plural users of the software structure. Referencing the software structure during program execution involves referencing the counter. The counter is incremented by a value of one each time a new user establishes access to the software structure. The counter is decremented by a value of one each time a user relinquishes access to the software structure. When the counter value becomes zero, the software structure is deleted, as the software structure is no longer needed when it has no users. A complete description of the related art reference count structure is provided in Meyers, S., *More*

*Effective C++*, Addison Wesley Longman, Inc., Massachusetts, 1996, which is incorporated herein by reference.

The reference counting technique is utilized to track the number of users of a software object. One reason for using reference counting techniques is to eliminate redundant storage. In computer programming languages such as C and C++, a reference to a character string literal is a pointer to the first character in the string. In some implementations, plural references to the same literal character string leads to excessive redundancy of the same values stored in computer memory.

In other implementations, a compiler recognizes the value of a character string as it parsed, creates the string, stores it in computer memory, and associates the address of the string with references to the string for users of the string. As users dynamically relinquish reference to the string, a used string must remain in existence until every user of the string relinquishes reference to the string. The reference counting technique establishes a counter of the current number of users of a particular software structure. As new users of a software structure reference the software structure, the counter is incremented to reflect the total number of users of the software structure. As software structures are updated to no longer reference the used software structure, the reference value is decremented to reflect the current number of users of the used software structure. When the reference counter reaches a value of zero, the used software structure is deleted, freeing up computer memory for other uses. If a system needs to delete the used software structure while there exists at least one user of the used software structure, there is no easy way to inform users of the deletion of the used software structure that it is being deleted.

FIGS. 1A and 1B illustrate an exemplary reference counting scheme. FIG. 1A illustrates an exemplary reference counting scheme with a single USED OBJECT 40, a REFERENCE COUNT in a REFERENCE COUNTED OBJECT 38, and four user objects USER 1 object 30, USER 2 object 32, USER 3 object 34, and USER 4 object 36. The REFERENCE COUNT 38 contains a value of 4, reflecting a total of four user objects currently using the USED OBJECT 40. Arrows from each of the user objects to the REFERENCE COUNTED OBJECT 38 denote pointers from each user object to the REFERENCE COUNTED OBJECT 38. An arrow from the REFERENCE COUNT 38 to the USED OBJECT 40 denotes a pointer to the USED OBJECT 40.

FIG. 1B illustrates the same reference counting scheme as shown in FIG. 1A, with only the USER 1 object 30 using the USED OBJECT 40. The USER 2 object 32, USER 3 object 34, and USER 4 object 36 of FIG. 1A are no longer users of the USED OBJECT 40, and the REFERENCE COUNT 38 contains a value of 1, reflecting three fewer users of the USED OBJECT 40 than in FIG. 1A. If the USER 1 object 30 relinquishes access to the USED OBJECT 40, the REFERENCE COUNT 38 is updated to contain a value of zero, signifying that there are no current users of the USED OBJECT 40, and that the USED OBJECT 40 is a candidate for deletion.

Using the reference counting technique, if the referenced software structure is deleted when the counter value is zero, the storage for the referenced software structure is typically returned to the operating system for other uses.

If a user who has not relinquished access to the software structure executes instructions to access the software structure after it is deleted, the results would be unpredictable, but would likely lead to addressability errors and a system crash. The reference counting technique ensures that the used object exists as long as at least one user of the object exists. However, situations exist wherein a system needs to delete a used object and reset all user references to the used object to reflect deletion of the used object for safety. In such cases, the reference counting technique is not appropriate.

SUMMARY OF THE INVENTION

Accordingly, one object of this invention is to provide a novel method, system, computer program product, memory, and object-oriented system for resetting references to software structures. Exemplary software structures include software objects, data items, software routines, and modules.

It is a further object of this invention to provide a novel method, system, computer program product, memory, and object-oriented system for resetting pointers to reflect deletion of a referenced software object when the referenced software object is deleted inside or outside the module of the referenced software object.

These and other objects are accomplished by a method, system, computer program product, memory, and object-oriented system for resetting references, such as pointers, to reflect deletion of a referenced software structure, such as a software object, data item, software routine, or module, when the referenced software structure is deleted.

An exemplary application for the present invention is resetting pointer values to zero, or a null value, for pointers to a referenced software object, when the referenced software object is deleted inside or outside the module of the referenced software module. The present invention is currently implemented in C++, in an object-oriented framework, with software objects using other software objects in different modules. A software object to be used by other software objects is created in a module, and is referenced by plural software objects in the same or other modules. The created software object is defined to have an array of users, used as a list of current users of the software object, initially set to have values of zero, or null, in all array elements. Alternatively, the array of users is implemented in the format of a linked list of references to users, or in the format of an iterator structure or a list or vector of the Standard Template Library of C++. Other software objects which establish reference to the created software object are derived from a common object-oriented class having a reference pointer to the type of the created software object for a software object attribute.

When a software object establishes a reference to the created software object, the object is registered with the created software object by inserting a reference to the software object in the array of users of the created software object, for example, by inserting a pointer to the software object in the array of users in place of a zero, or null, element. Alternatively, the name of the software object instance is inserted in the array of users. If the name of the software object instance is used, then a look-up is done to translate the name into an effective computer memory address when the name is referenced. The reference pointer of the software object is assigned a value of a reference to the created object. Alternatively, the reference pointer is maintained by assigning the name of the created object instance to the reference pointer. In this manner, the created object maintains a registry of all current users of the created object.

When a user software object is deleted, or modified to not reference the created object, the created software object is accessed by using the reference pointer value of the user software object. The array of users is accessed in the created object, and the reference to the user software object is set to a value of zero, signifying a null pointer. When the created, or referenced, software object is deleted, the array of users is accessed. For each non-zero, or non-null reference in the array of users, the user software object referenced by the array element is accessed to be unregistered. The reference pointer of the user software object is then set to zero, or null, for each user software object. In this manner, user software objects no longer reference a created referenced software object after the created object has been deleted, and users of the created software object have been unregistered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
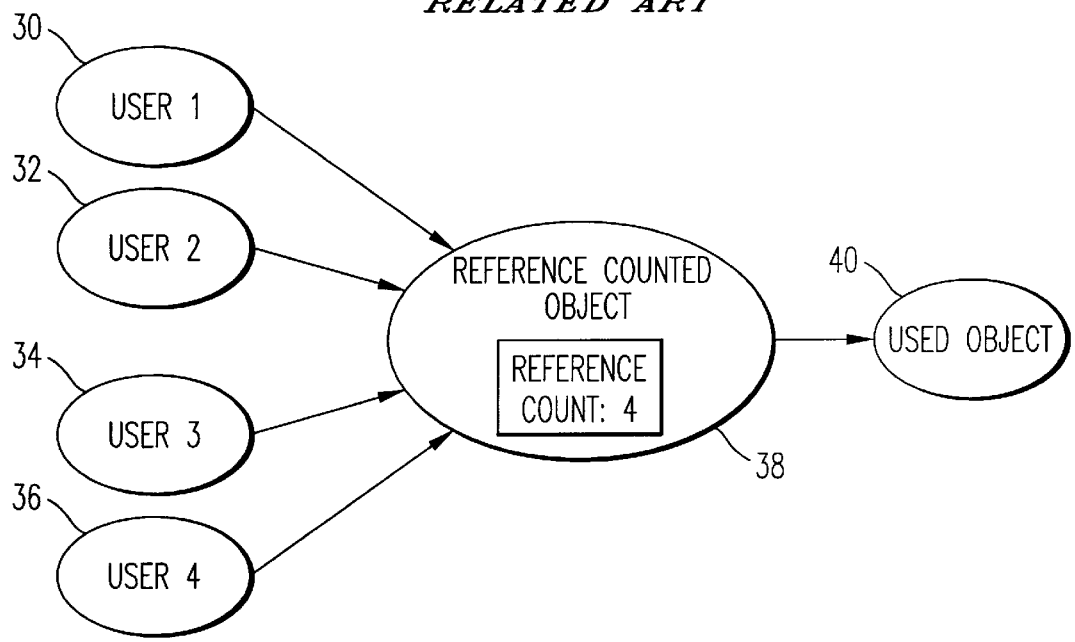
FIG. 1A illustrates an exemplary related art technique of reference counting, with four users illustrated.
Figure 1B:
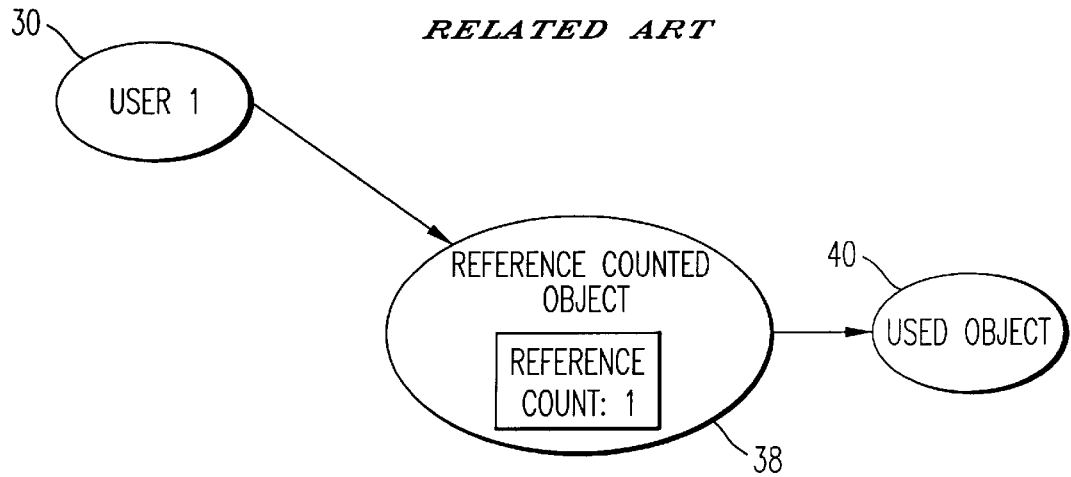
FIG. 1B illustrates an exemplary related art technique of reference counting, with one user illustrated.
Figure 2A:
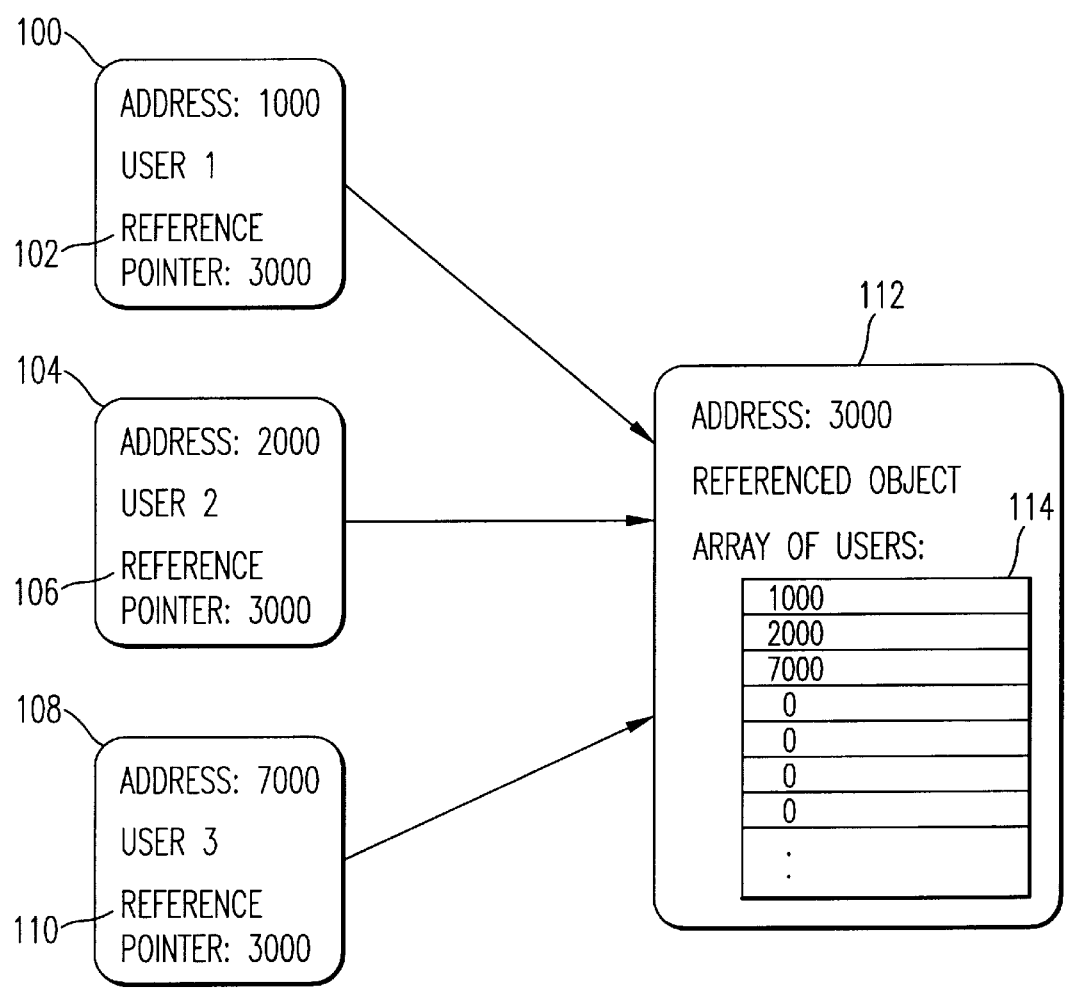
FIG. 2A illustrates an example of three registered users referencing a referenced object.
Figure 2B:
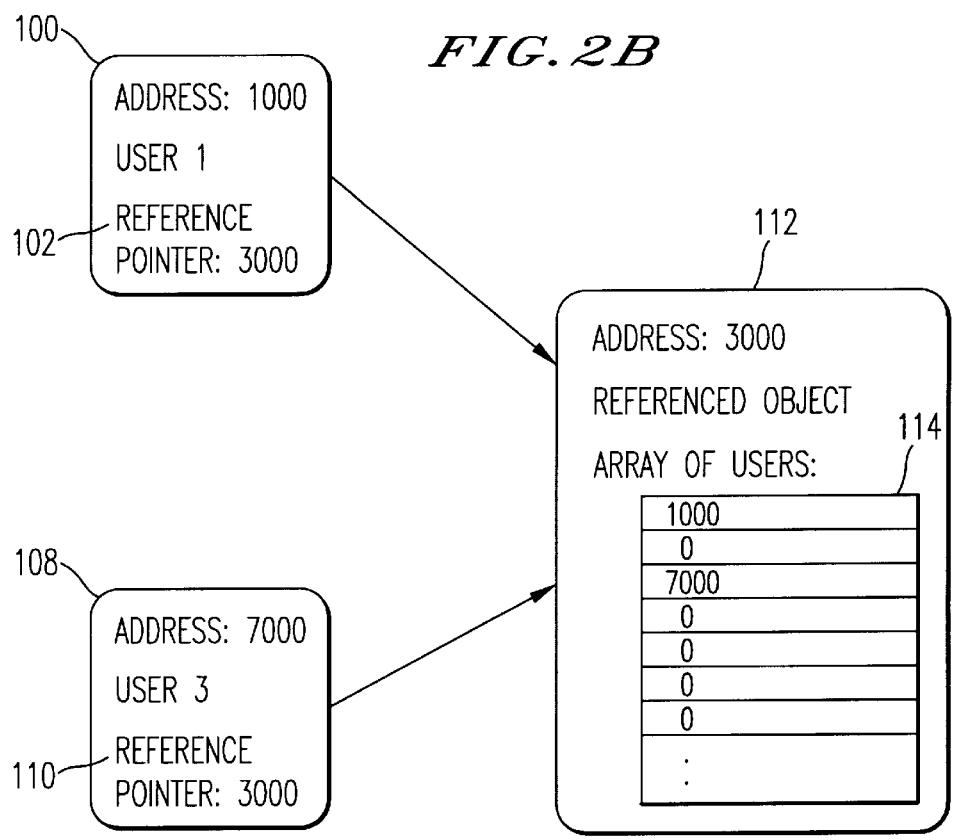
FIG. 2B illustrates an example of two registered users referencing one referenced object, after a user has been unregistered.
Figure 2C:
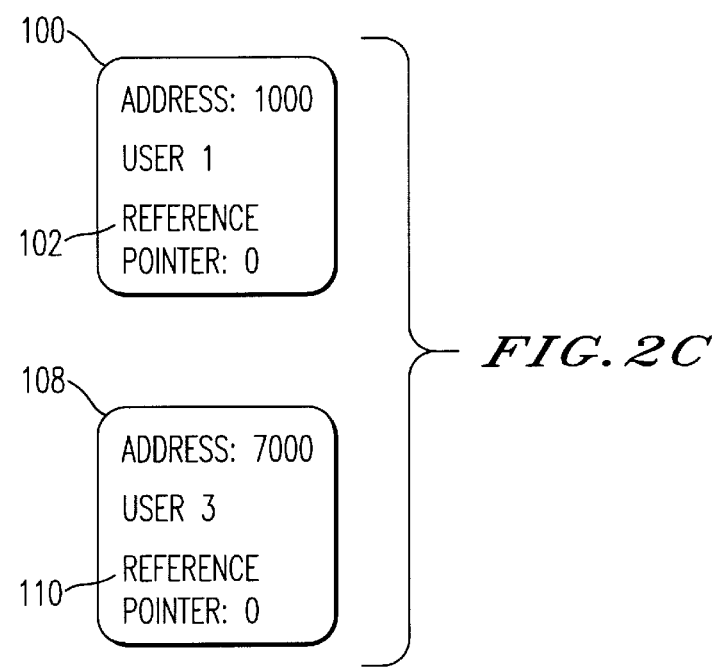
FIG. 2C illustrates an example of two users of an object which has been deleted.

Referring now to the drawings, wherein like reference numerals designate identical or corresponding parts throughout the several views, and more particularly to FIGS. 2A–2C thereof, there are illustrated exemplary user objects for a referenced object as a user object and the referenced object, respectively, are deleted. FIGS. 2A–2C are presented to convey theoretical diagrams of objects accessing other objects. For example, an object would likely not have the address or the name of the object stored as part of the object itself. Therefore, an explanatory "ADDRESS: 1000" is intended to show that an object is located at computer memory address 1000. An explanatory "USER 1" is intended to communicate the concept of a first user of the referenced object. An explanatory "REFERENCED OBJECT" is intended to communicate the concept of the referenced object. Neither the addresses of the objects themselves, nor the names of the objects themselves, are required to be stored as part of the objects, in reality. User objects minimally have values for reference pointers as shown, but not necessarily the string "REFERENCE POINTER:". A referenced object minimally has values for an array of users as shown, but not necessarily the string "ARRAY OF USERS:".

For this example, a USER 1 object 100 is located at computer memory address 1000, having a REFERENCE POINTER 102 containing a reference to computer memory address 3000, which is the computer memory address of a REFERENCED OBJECT 112. Alternatively, the reference pointer could be implemented as the name of the referenced object instance, and a further look-up could be used to translate the name into an absolute computer memory address when needed. A USER 2 object 104 is located at computer memory address 2000, having a REFERENCE POINTER 106 containing a reference to computer memory address 3000. A USER 3 object 108 is located at computer memory address 7000, having a REFERENCE POINTER 110 containing a reference to computer memory address 3000.

The REFERENCED OBJECT 112 is located at computer memory address 3000 having an ARRAY OF USERS 114. Arrows from each of the user objects to the REFERENCED OBJECT 112 denote the reference pointer, having a value of 3000, from each object to the REFERENCED OBJECT 112. The ARRAY OF USERS 114 represents a list of references to users of the REFERENCED OBJECT 112. Alternatively, the list of references to users could be implemented using a linked list or iterator structure or C++ Standard Templates such as list and vector. The REFERENCED OBJECT 112 is illustrated in FIGS. 2A and 2B as containing a list in the form of an array. However, the list of users could be represented in storage not contiguous to the REFERENCED OBJECT 112, for example, as a linked list wherein a pointer to the list is maintained as a part of the REFERENCED OBJECT 112, and the list is stored in dynamically allocated computer memory. Alternatively, the list of references could be maintained as a list of names of users.

For this example, the first value of 1000 in the ARRAY OF USERS 114 signifies that the USER 1 object 100, located at computer memory address 1000, is a current user of REFERENCED OBJECT 112. The second value of 2000 in the ARRAY OF USERS 114 signifies that the USER 2 object 104, located at computer memory address 2000, is a current user of the REFERENCED OBJECT 112. The third value of 7000 in the ARRAY OF USERS 114 signifies that the USER 3 object 108, located at computer memory address 7000, is a current user of the REFERENCED OBJECT 112. The fourth, and succeeding values of zero in the ARRAY OF USERS 114 signify empty, or null references.

If the USER 2 object 104 of FIG. 2A is destroyed or updated to no longer reference the REFERENCED OBJECT 112, the ARRAY OF USERS 114 of FIG. 2A is updated by setting the second entry of the ARRAY OF USERS 114, which contains a value of a reference to the USER 2 object 104 in FIG. 2A, to a value of zero. FIG. 2B illustrates the same example as in FIG. 2A, after the USER 2 object 104 of FIG. 2A has been updated to no longer reference the REFERENCED OBJECT 112. The USER 1 object 100 at computer memory address 1000 has the REFERENCE POINTER 102, having a value of 3000. The USER 3 object 108 at computer memory address 7000 has the REFERENCE POINTER 110, having a value of 3000. The REFERENCED OBJECT 112, located at computer memory address 3000, has the ARRAY OF USERS 114 with a second value of zero, signifying an empty, or null reference.

In order to delete the REFERENCED OBJECT 112 of FIG. 2B, the ARRAY OF USERS 114 is examined to determine non-empty, or non-null references to the REFERENCED OBJECT 112. Two references having values of 1000 and 7000 respectively are determined to be non-empty, or non-null references in FIG. 2B. The reference of 1000 refers to the USER 1 object 100, and the REFERENCE POINTER 102 of the USER 1 object 100 is updated to reflect a value of zero for an empty, or null reference to a used object. The reference value of 7000 denotes a reference to the USER 3 object 108, and the REFERENCE POINTER 110 of the USER 3 object 108 is updated to a value of zero to reflect an empty, or a null reference to a used object. The REFERENCED OBJECT 112 is then a candidate for deletion, as all registered users have been unregistered. FIG. 2C illustrates the USER 1 object 100 and the USER 3 object 108 after deletion of the REFERENCED OBJECT 112.

Figure 3A:
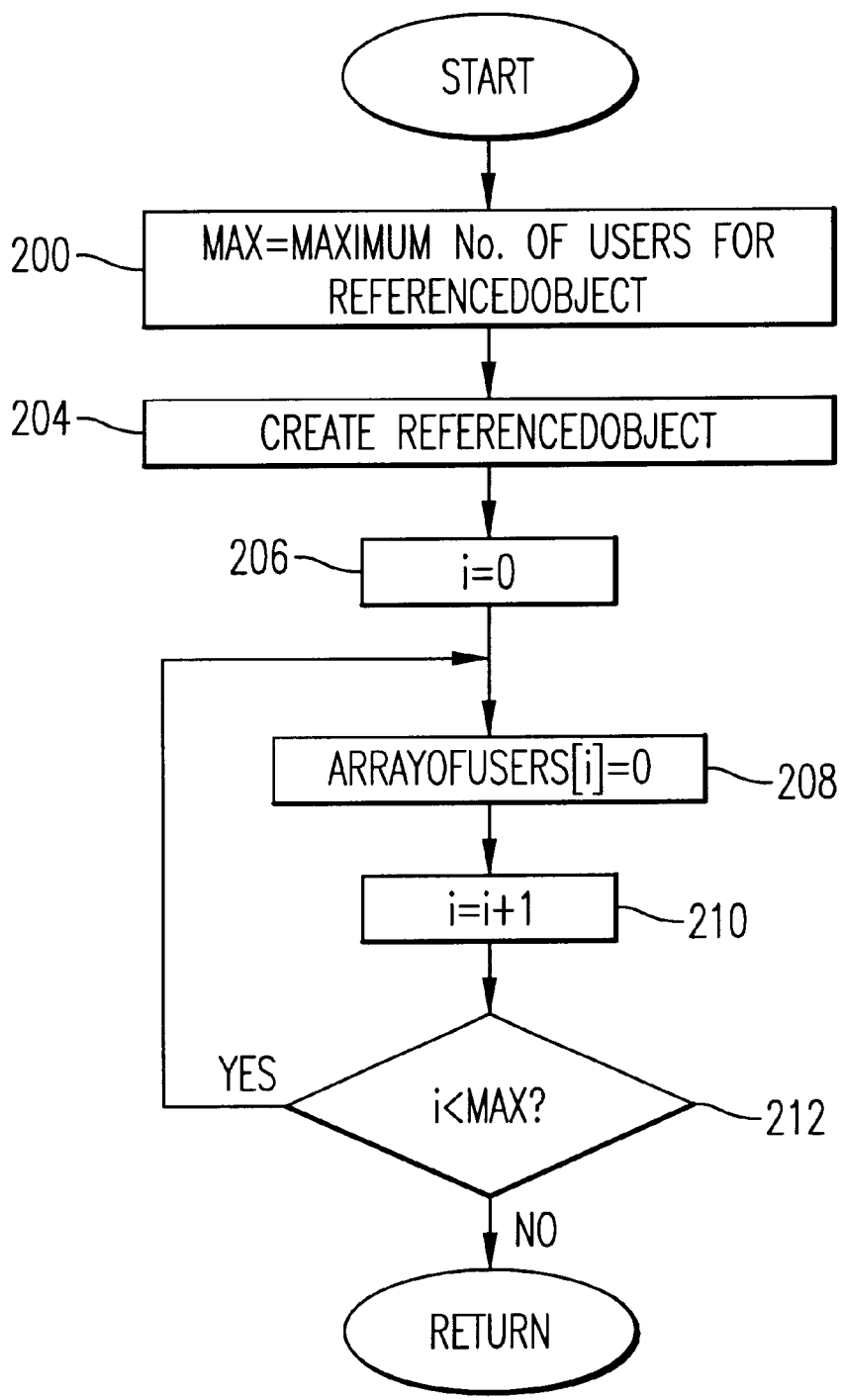
FIG. 3A illustrates a logical flowchart for creating a referenced object.

FIG. 3A illustrates an exemplary logical flowchart showing a flow of execution for creation of a referenced object for the present invention, and for initialization of the array, or list of users of the referenced object to reflect no current users. After starting, step 200 sets a variable MAX to a value of the maximum number of users for a referenced object in the system. MAX is used in creating a referenced object for allocating adequate space for an array of users. This step may be unnecessary if an alternative representation, such as a dynamically allocated linked list, is used to store references to users of the referenced object. Step 204 then creates the referenced object, allocating space for the array of users, which corresponds to the ARRAY OF USERS 114 of FIGS. 2A and 2B. The array of users is initialized iteratively by setting all array entries to a value of zero to indicate no current users of the referenced object. Step 206 sets an index i to a value of zero to initiate a loop for initializing the array. Step 208 sets an ith element of the array of users to a value of zero as the iterating step of the initializing loop. Step 210 increments the index i by one. Step 212 determines if the index i is less than the value of MAX. If the value of i is greater than or equal to MAX, the loop is exited and control is returned to the system. If the value of i is less than MAX, flow proceeds to step 208 to continue initialization of the array of users. This initialization is performed at the time of construction of the referenced object.

Figure 3B:
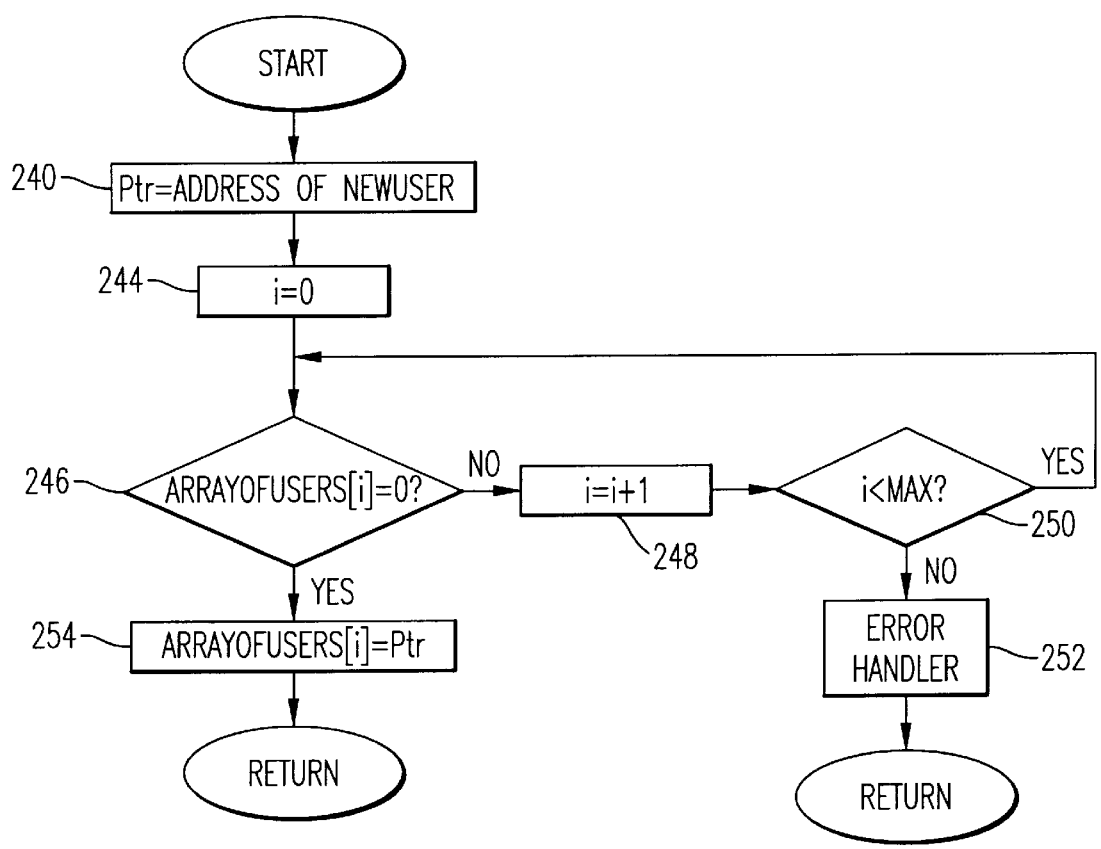
FIG. 3B illustrates a logical flowchart for registering a new user of a referenced object.

FIG. 3B illustrates a logical flowchart showing the flow of execution for registration of a new user of a referenced object. After starting, step 240 sets a pointer to contain the address of the new user. This pointer will be used to insert the address of the new user in an array of users in the referenced object. The new user corresponds, for example, to the USER 1 object 100 of FIGS. 2A–2C. The array of users corresponds to the ARRAY OF USERS 114 of FIGS. 2A and 2B.

Step 244 then sets an index i to have a value of zero. The index i will be used to iterate through the array of users to determine a zero, or null, element which is eligible to be assigned the address of the new user to register the new user. Step 246 then determines if the ith element of an array of users has a value of zero. If it is determined to have a non-zero value, step 248 increments the value of i by one, and step 250 determines if the new value of the index i is less than MAX. If the value of i is determined to be greater than or equal to MAX, flow proceeds to step 252 for an error handler and control is returned to the system, as there are more requesting users of the referenced object than the design accommodates. If the value of i is determined to be less than MAX in step 250, the flow proceeds to step 246 to continue searching for a non-zero, or non-null array element. If the ith element of the array of users is determined to be equal to zero in step 246, flow proceeds to step 254, wherein the ith element of the array of users is set to have a value of the pointer, which is the address of the newly created user, thereby registering the user. Control is then returned to the system.

Figure 3C:
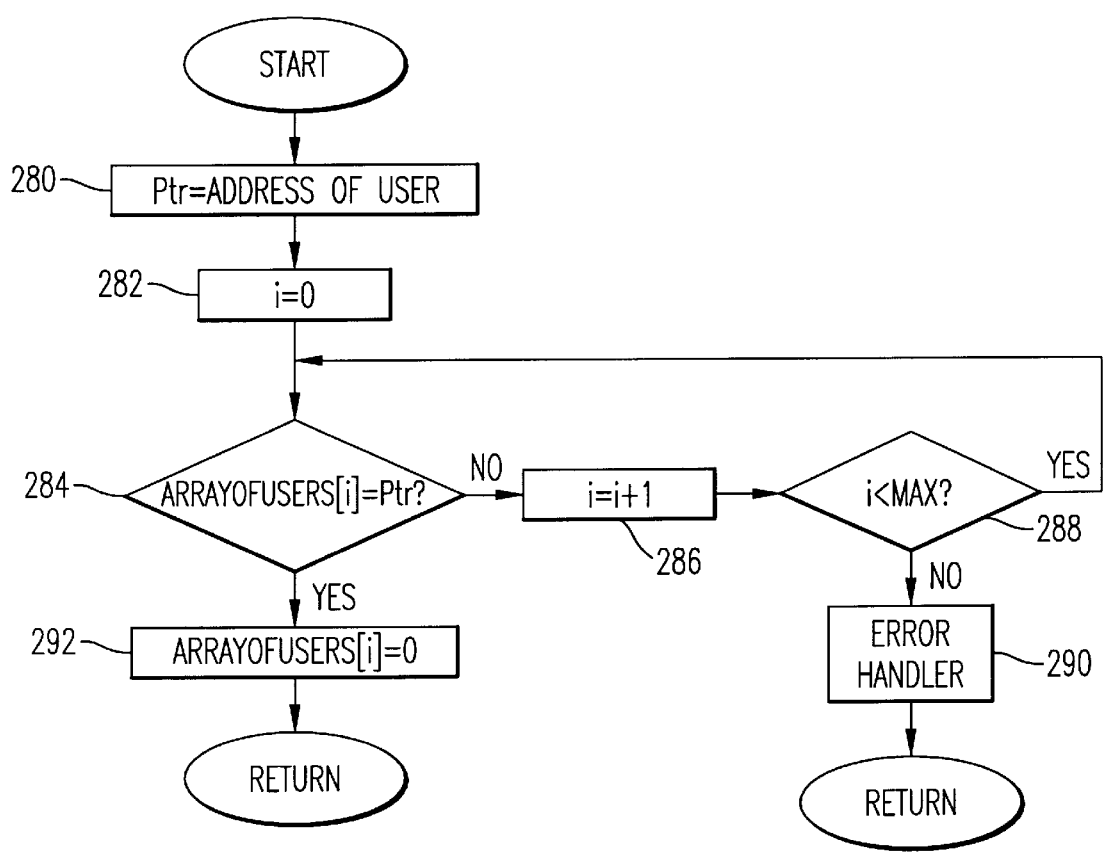
FIG. 3C illustrates a logical flowchart for unregistering a user of a referenced object.

FIG. 3C illustrates a logical flowchart to exemplify the flow of execution to unregister a user of a used object. The user corresponds, for example, to the USER 1 object 100 of FIGS. 2A–2C. The used object corresponds to the REFERENCED OBJECT 112 of FIGS. 2A and 2B. After starting, step 280 sets a pointer variable Ptr to have a value of the address of a user. This pointer value will be used to iteratively search the array of users of the used object to delete the value, thereby unregistering the user. Step 282 sets an index value i to zero. The index i is used to iterate through the array of users searching for a reference to the user object requesting to be unregistered. Step 284 determines if the ith element of the array of users of the used object has a value of the address of the user. If step 284 determines that it does, step 292 sets the ith element of the array of users to a value of zero, thereby unregistering the user. Control is then returned to the system.

If step 284 determines that the ith element of the array of users is not equal to the address of the user, flow proceeds to step 286 where the index i is incremented by one. Step 288 then determines if the index i has a value less than MAX. If step 288 determines that it does not, flow proceeds to step 290 for an error handler and control is returned to the system, as the user requesting to be unregistered is not registered. If it is determined in step 288 that i has a value less than MAX, flow proceeds to step 284 to continue iteratively searching for a reference to the user.

Figure 3D:
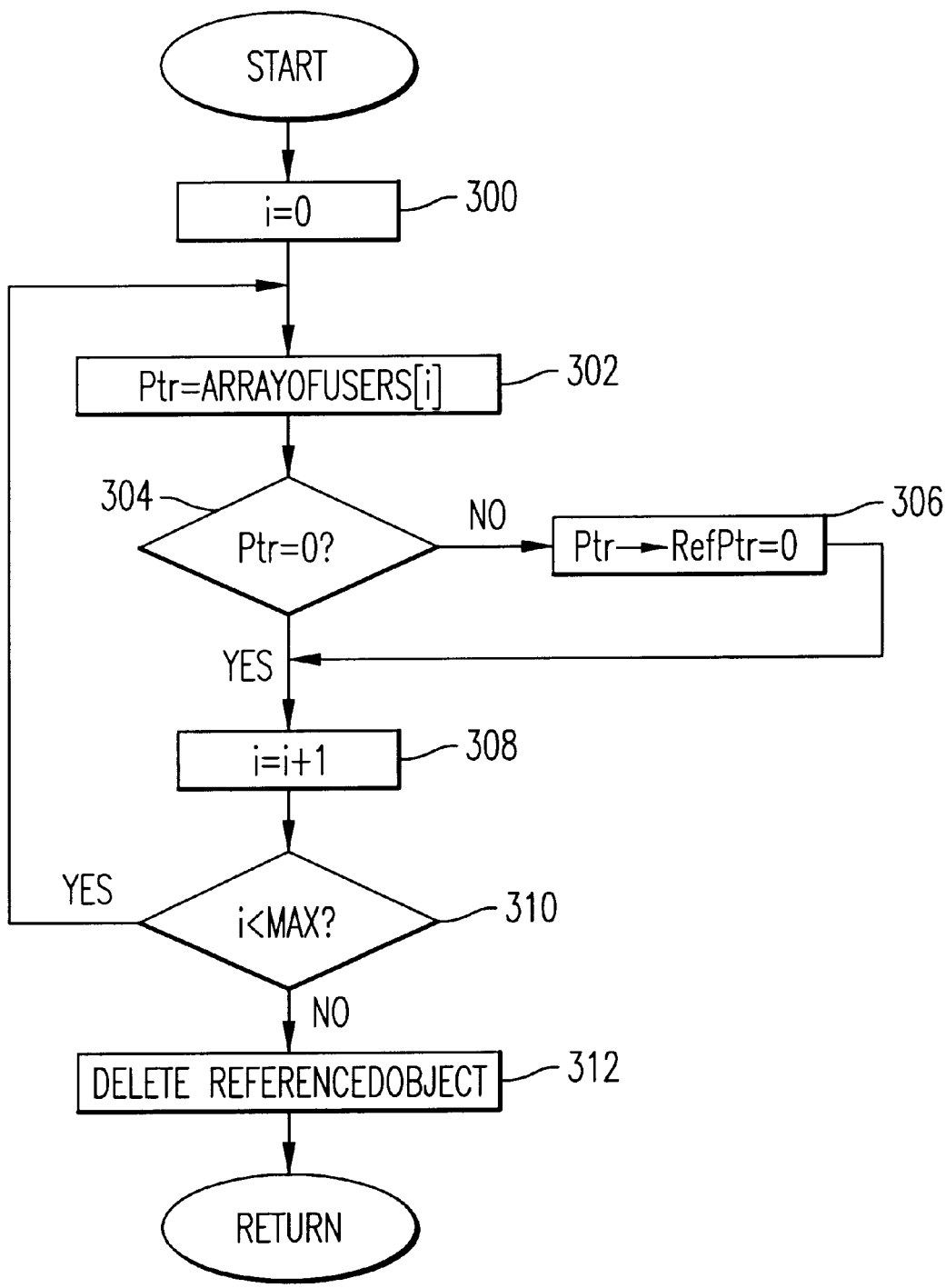
FIG. 3D illustrates a logical flowchart for deleting a referenced object and unregistering users of the object.

FIG. 3D illustrates an exemplary logical flowchart showing a flow of execution for deleting a referenced object. FIG. 3D is not presented to show a conditional deletion but presents a process which unconditionally performs deletion. The referenced object corresponds to the REFERENCED OBJECT 112 of FIGS. 2A and 2B. After starting, step 300 sets an index i to have a value of zero. For each of FIGS. 3A, 3B, 3C, and 3D, the index i is a generic iterating index used to step through loops in the respective figures. The index i of any one of FIGS. 3A–3D does not correspond to the index i of any other one of the FIGS. 3A–3D. The index i of FIG. 3D is used to iterate through the array of users to determine all non-zero or non-null elements so that all registered users are updated not to have a reference to the referenced object before the referenced object is deleted.

Step 302 sets a variable Ptr to have a value of the ith element of the array of users. Step 304 determines if the variable Ptr has a value of zero. If step 304 determines that Ptr does not have a value of zero, the value of Ptr is used as a reference to a user object to set its reference pointer to have a value of zero, and flow then proceeds to step 308. The user object corresponds, for example, to the USER 1 object 100 of FIGS. 2A–2C. The reference pointer corresponds, for example, to the REFERENCE POINTER 102 of FIGS. 2A–2C. Setting the reference pointer of the user object to zero updates the user object to longer access the referenced object.

If step 304 determines that Ptr has a value of zero, flow proceeds to step 308 where the index i is incremented by one. Step 310 determines if the index i has a value less than MAX. If step 310 determines that i does not have a value less than MAX, then flow proceeds to step 312 where the referenced object is deleted, as all users have been unregistered, and control returns to the system. If step 310 determines that index i has a value less than MAX, then flow returns to step 302 to continue iterating through the array of users so that reference pointers for all user objects will be updated to have a value of zero before the referenced object is deleted.

Conditional deletion of the referenced object is possible using the structures of FIGS. 2A and 2B by checking the list of users of the referenced object to determine if there are any non-null references to users. If the list of users is empty, or if all entries are zero or null, the referenced object is a candidate for deletion.

Figure 4A:
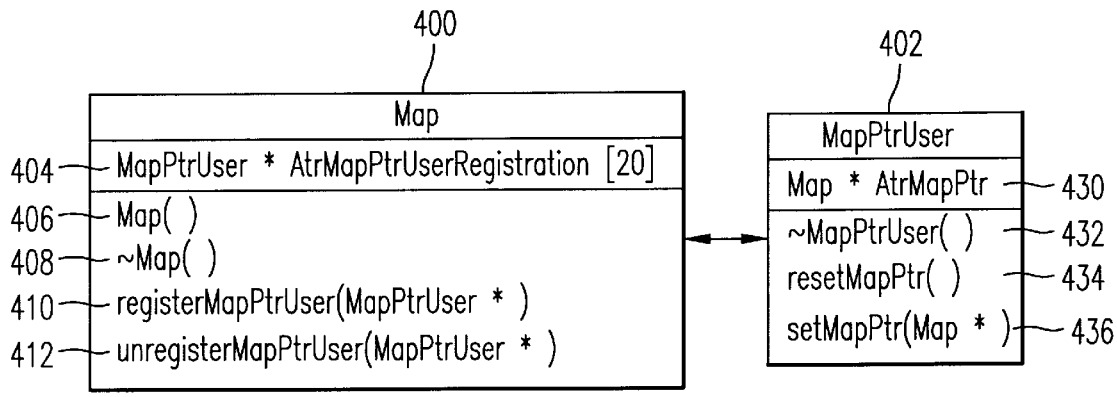
FIG. 4A illustrates an object-oriented structure for a Map used object class for a referenced object and a MapPtrUser class for user objects.
Figure 4B:
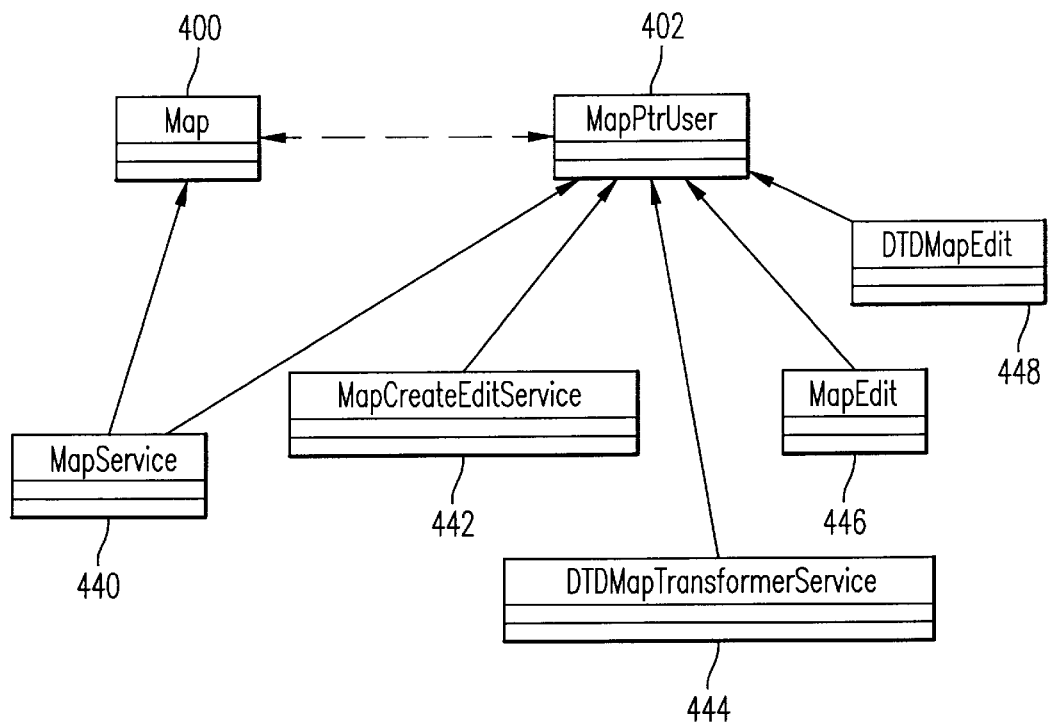
FIG. 4B is an object-oriented class diagram for a used object class and user object classes.

FIGS. 4A and 4B are presented to illustrate an example of an actual object-oriented implementation of the registration of user objects for a used object Map 400. The implementation is related to currently pending patent applications for a method and object-oriented system for mapping structured information to different structured information. FIG. 4A illustrates the structure of the class MAP 400 and a class MapPtrUser 402. The MAP 400 corresponds to the REFERENCED OBJECT 112 of FIGS. 2A and 2B. The class Map 400 has an array AtrMapPtrUserRegistration 404 of 20 elements of type pointer to MapPtrUser. The array AtrMapPtrUserRegistration 404 is used to register user objects of the Map 400, and corresponds to the ARRAY OF USERS 114 discussed previously with regard to FIGS. 2A and 2B. A method Map 406 is the constructor for the class Map 400, and is used to create a used object Map 400. The logical flow of creation of the Map 400 has been described previously with regard to creation of the REFERENCEDOBJECT of FIG. 3A. A method ~Map 408 is a destructor method for the class Map 400, and is used to delete the used, or referenced object Map 400. The logical flow of deletion of the Map 400 has been described previously with regard to deletion of the REFERENCEDOBJECT of FIG. 3D.

A method registerMapPtrUser 410 is a method for registering users of an object Map 400. The logical flow of registering users of the Map 400 has been described previously with regard to registering the NEWUSER of FIG. 3B. A method unregisterMapPtrUser 428 is used to unregister users of an object Map 400. The class MapPtrUser 402 has a data item AtrMapPtr 440 which is type pointer to Map. A method ~MapPtrUser 442 is used to destruct users of the object Map 400. A method resetMapPtr 444 is used to reset pointers to the object Map 400 when it is desired to longer reference the object Map 400. A method setMapPtr 446 is used to set pointers to the referenced object Map 400.

FIG. 4B illustrates an object-oriented class structure for the used object MAP 400 and the user object MapPtrUser 402. The MAP 400 corresponds to the REFERENCED OBJECT 112 of FIGS. 2A and 2B. The instances of classes derived from the MapPtrUser 402 correspond to the user objects, for example, USER 1 object 100, USER 2 object 104, and USER 3 object 108 previously discussed with regard to FIGS. 2A–2C. A class MapService 440, a class MapCreateEditService 442, a class DTDMapTransformerService 444, a class MapEdit 446, and a class DTDMapEdit 448 are derived from the class MapPtrUser 402. However, the Map class 400 does not need information regarding what classes are derived from the class MapPtrUser 402. The Map class 400 only needs information regarding the base class, MapPtrUser 402.

Figure 4C:
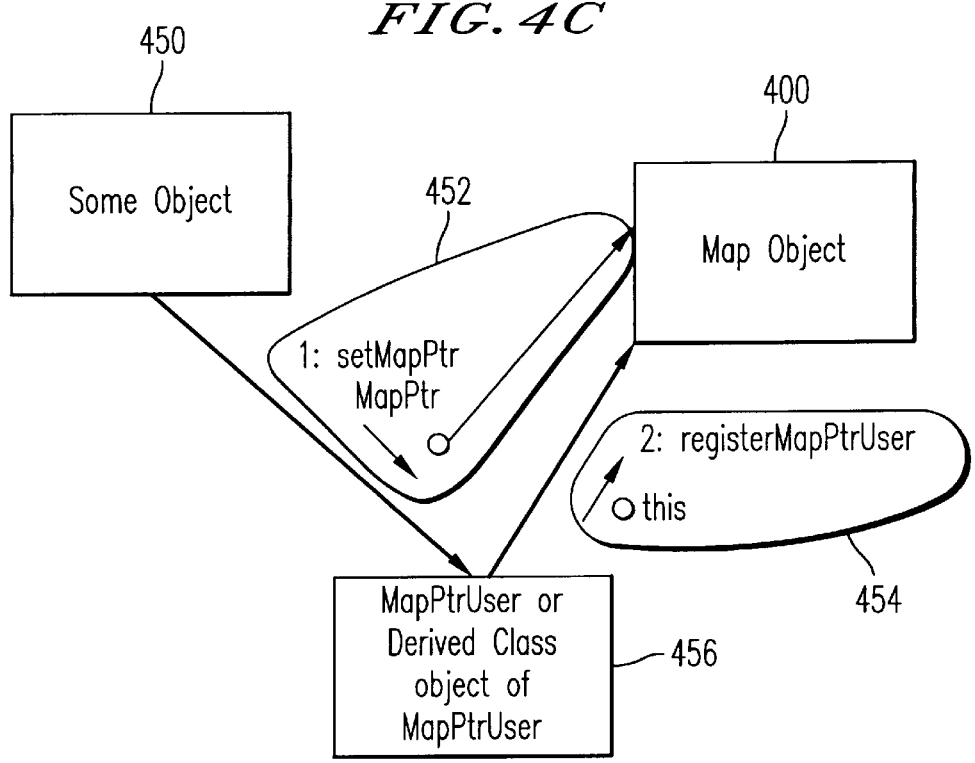
FIG. 4C is an object diagram for registering a user of a Map object.

FIG. 4C is an object diagram for registering a user of a Map Object 400. The logical flow for this has been discussed previously with regard to FIG. 3B. The Map Object 400 corresponds to the Map 400 discussed previously with regard to FIGS. 4A and 4B. A MapPtrUser or Derived Class object of MapPtrUser 456 corresponds to the MapPtrUser 402, the class MapService 440, the class MapCreateEditService 442, the class DTDMapTransformerService 444, the class MapEdit 446, and the class DTDMapEdit 448 discussed previously with regard to FIGS. 4A and 4B, and to the NEWUSER discussed previously with regard to step 240 of FIG. 3B. Each instantiated object of a derived class of the MapPtrUser 402 has an AtrMapPtr 430 as illustrated in FIG. 4A. The Map Object 400 has the array AtrMapPtrUserRegistration 404 as illustrated in FIG. 4A, which corresponds to the ARRAYOFUSERS discussed previously with regard to step 246 and step 254 of FIG. 3B.

A software object Some Object 450 sends a pointer having a value of a pointer to the Map Object 400 to an instantiated object of the MapPtrUser or Derived Class object of MapPtrUser 456 by calling a method setMapPtr 452, sending a MapPtr value 452, which is the value of the pointer to the Map Object 400. In FIG. 4C, the pointer value MapPtr 452 is assumed to be non-zero and different from the address already existing in the AtrMapPtr 430 as shown in FIG. 4A. The MapPtrUser or Derived Class object of MapPtrUser 456 then calls a method registerMapPtrUser 454, sending a 'this' 454 as a parameter. This means that the MapPtrUser or Derived Class object of MapPtrUser 456 is registering itself with the referenced object Map Object 400. In the C++ programming language, an object references itself using the keyword 'this.' If the value of the MapPtr 452 is zero and the value of the AtrMapPtr 430 for MapPtrUser or Derived Class object of MapPtrUser 456 is non-zero, then the MapPtrUser or Derived Class object of MapPtrUser 456 will need to be unregistered. If the values of Mapptr 452 and AtrMapPtr 430 are the same, no action is taken, as the MapPtrUser or Derived Class object of MapPtrUser 456 is already registered with the current Map Object 400.

Figure 4D:
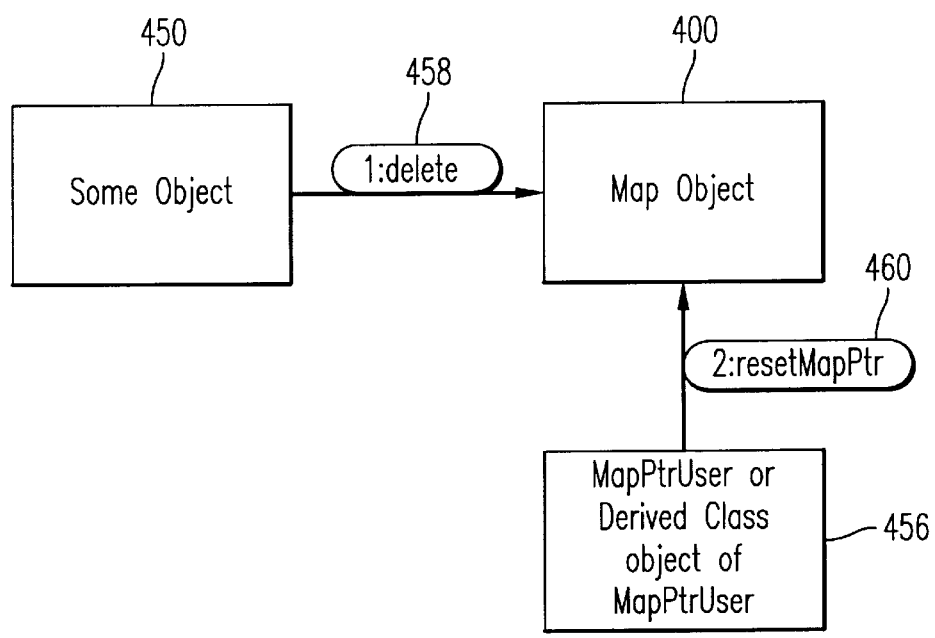
FIG. 4D is an object diagram for deleting a used Map object.

FIG. 4D is an object diagram for deleting a referenced Map Object 400. The logical flow for this deletion has been discussed previously with regard to FIG. 3D. The Map Object 400 corresponds to the Map 400 discussed previously with regard to FIGS. 4A and 4B and to the Map Object 400 of FIG. 4C, and to the REFERENCEDOBJECT in step 312 of FIG. 3D. A MapPtrUser or Derived Class object of MapPtrUser 456 corresponds to the MapPtrUser or Derived Class object of MapPtrUser 456 discussed previously with regard to FIG. 4C, and to the RefPtr in step 306 of FIG. 3D. A Some Object 450 calls a method delete 458 to delete the Map Object 400. In response, the Map Object 400 calls a method resetMapPtr 460 for every user registered in the array AtrMapPtrRegistration 404 of FIG. 4A. For every registered user, a MapPtrUser or Derived Class object of MapPtrUser 456 is referenced to set the AtrMapPtr 430 of FIG. 4A to reflect no current reference to a referenced Map Object 400. The Map Object 400 is then deleted from the system. In this way, all the registered users of the referenced object get their references set to zero, or null, to reflect no current reference to a referenced Map Object 400, before the referenced object is deleted.

Figure 4E:
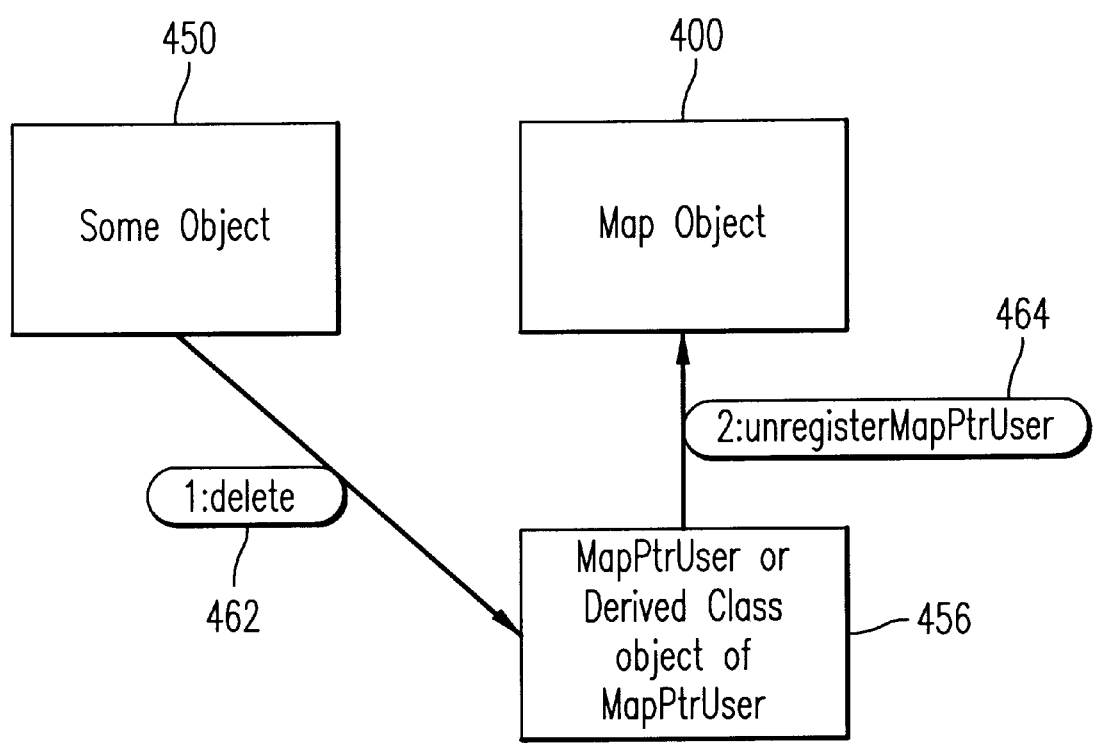
FIG. 4E is an object diagram for deleting and unregistering a user object of the used Map object.

FIG. 4E is an object diagram for deleting and unregistering a user object referencing a Map Object 400. The logical flow for unregistering a user object has been discussed previously with regard to FIG. 3C. The Map Object 400 corresponds to the Map 400 discussed previously with regard to FIGS. 4A and 4B and to the Map Object 400 of FIG. 4C. A MapPtrUser or Derived Class object of MapPtrUser 456 corresponds to the MapPtrUser or Derived Class object of MapPtrUser 456 discussed previously with regard to FIGS. 4C and 4D, to the MapPtrUser 402 discussed previously with regard to FIGS. 4A and 4B, and to the USER in step 280 of FIG. 3C.

A Some Object 450 calls a method delete 462 to delete the MapPtrUser or Derived Class object of MapPtrUser 456. The MapPtrUser or Derived Class object of MapPtrUser 456 then calls a method unregisterMapPtrUser 464 to unregister the user object from the array AtrMapPtrUserRegistration 404 of FIG. 4A for the Map Object 400 of FIG. 4E. The called method unregisterMapPtrUser 464 corresponds to the method unregisterMapPtrUser 412 discussed previously with regard to FIG. 4A. The array AtrMapPtrUserRegistration 404 of FIG. 4A is then searched to unregister the calling user object. The user object is then a candidate for deletion from the system.

The application of the current technique is not limited to the objects illustrated in FIGS. 4A–4E. It is frequently difficult to control access to memory which has been allocated to data which has now been deleted in an embedded system. The current technique can be used to ensure pointers are updated to reflect deletion if a referenced memory area is deleted from the system. Therefore, if desired, the only test required to construct software is to test if the pointer value is zero, or null, or reflects deletion of a referenced area, before using the pointer. The present invention ensures that when the pointer value does not reflect deletion of a used software object, the referenced software object exists and can be used, thus eliminating core dumps or system hang-ups caused by the use of non-zero or non-null pointers when the referenced software object has been deleted.

Figure 5:
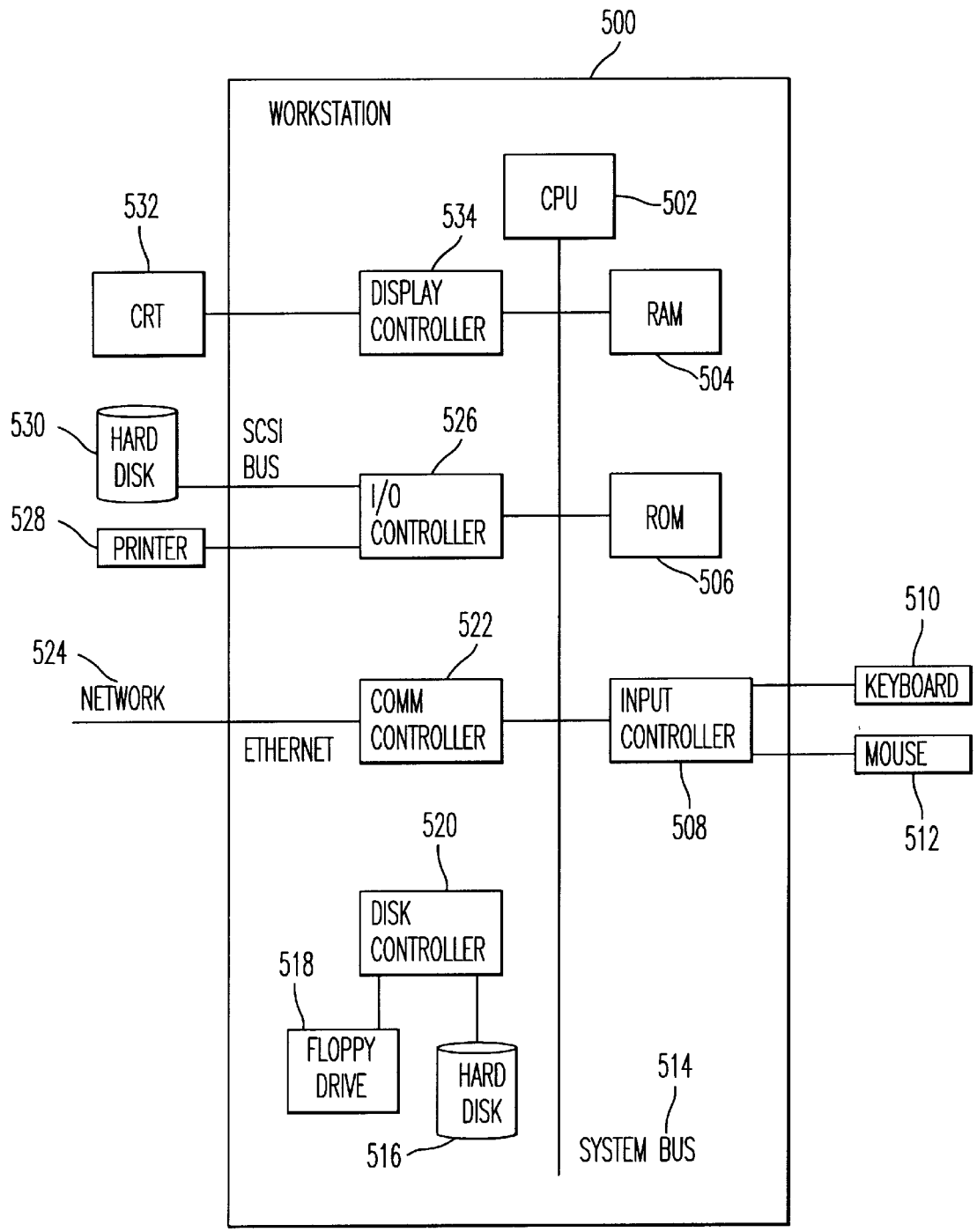
FIG. 5 illustrates a hardware embodiment of the present invention.

FIG. 5 illustrates an exemplary hardware configuration upon which the invention may be implemented. A Workstation 500 has component parts a Display Controller 534, a Central Processing Unit ("CPU") 502, a Random Access Memory ("RAM") 504, a Read Only Memory ("ROM") 506, an Input Controller 508, connected to a Keyboard 510 and a Mouse 512, a System Bus 514, a Hard Disk 516 and a Floppy Drive 518 connected to a Disk Controller 520, a Comm Controller 522 connected to a Network 524, and an Input/Output ("I/O") Controller 526 connected to a Hard Disk 530 and a Printer 528, and a Cathode Ray Tube ("CRT") 532 connected to the Display Controller 534. The System Bus 514 connects the CPU 502, the RAM 504, the ROM 506, the Input Controller 508, the Disk Controller 520, the Comm Controller 522, the I/O Controller 526, and the Display Controller 534 for transmitting data over the connection line.

For example, the computer code generated for execution is loaded into the RAM 504 for execution by the CPU 502, using the System Bus 514, with input files stored on the Hard Disk 530, with other input coming from the Keyboard 510 and the Mouse 512 through the Input Controller 508, and from the Hard Disk 516 and the Floppy Drive 518, through the Disk Controller 520, onto the System Bus 514. The System Bus 514 interacts with the ROM 506, the Network 524, and the Comm Controller 522.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A computer implemented method for managing references to software structures, comprising the steps of:

creating a first software structure having a list of references to users of the first software structure;

creating a reference to the first software structure for a second software structure; and adding a reference to the second software structure to the list of references to users of the first software structure.

2. A method according to claim 1, wherein:

the step of creating the first software structure comprises:

creating the first software structure to have the list of references to users include a list of addresses of the users of the first software structure;

the step of creating the reference to the first software structure comprises:

creating the reference to the first software structure to include an address of the first software structure for the second software structure; and the step of adding the reference comprises:

adding the reference to the second software structure, the reference to the second software structure including an address of the second software structure, to the list of references to users of the first software structure.

3. A method according to claim 1, wherein:

the step of creating the first software structure comprises:

creating the first software structure to have the list of references to users include a list of names of the users of the first software structure;

the step of creating the reference to the first software structure comprises:

creating the reference to the first software structure to include a name of the first software structure for the second software structure; and the step of adding the reference comprises:

adding the reference to the second software structure, the reference to the second software structure including a name of the second software structure, to the list of references to users of the first software structure.

4. A method according to claim 1, wherein:

the step of creating the first software structure comprises:

creating the first software structure to include a first software object which has the list of references to users of the first software structure; and the step of creating the reference to the first software structure comprises:

creating the reference to the first software structure for a second software structure which includes a second software object.

5. A method according to claim 1, further comprising the steps of:
    processing the list of references to users of the first software structure to obtain the reference to the second software structure; and
    setting the reference to the first software structure of the second software structure to indicate deletion of the first software structure using the reference to the second software structure obtained by the processing step.

6. A method according to claim 5, further comprising the step of:
    deleting the first software structure.

7. A method according to claim 1, further comprising the steps of:
    obtaining the list of references to users of the first software structure;
    deleting the reference to the second software structure from the list of references to users of the first software structure; and
    deleting the second software structure.

8. A method according to claim 7, wherein:
    the step of obtaining the list of references to users of the first software structure further comprises:
    obtaining the reference to the first software structure of the second software structure; and
    obtaining the list of references to users of the first software structure using the reference to the first software structure which has been obtained.

9. A method according to claim 1, further comprising the steps of:
    obtaining the list of references to users of the first software structure;
    deleting the reference to the second software structure from the list of references to users of the first software structure; and
    modifying the reference to the first software structure of the second software structure to a modified reference value.

10. A method according to claim 9, wherein:
    the step of obtaining the list of references to users of the first software structure further comprises:
    obtaining the reference to the first software structure of the second software structure; and
    obtaining the list of references to users of the first software structure using the reference to the first software structure which has been obtained.

11. A method according to claim 1, further comprising the steps of:
    creating a reference to the first software structure for a third software structure; and
    adding a reference to the third software structure to the list of references to users of the first software structure.

12. A method according to claim 11, further comprising the steps of:
    processing the list of references to users of the first software structure to obtain the reference to the second software structure;
    setting the reference to the first software structure of the second software structure to indicate deletion of the first software structure using the reference to the second software structure which has been obtained;
    processing the list of references to users of the first software structure to obtain the reference to the third software structure; and
    setting the reference to the first software structure of the third software structure to indicate deletion of the first software structure using the reference to the third software structure which has been obtained.

13. A system for managing references to software structures for implementation by a computer, comprising:
    a storage means;
    means for creating a first software structure having a list of references to users of the first software structure;
    means for creating a reference to the first software structure for a second software structure; and
    means for adding a reference to the second software structure to the list of references to users of the first software structure.

14. A system according to claim 13, wherein:
    the means for creating the first software structure comprises:
    means for creating the first software structure to have the list of references to users include a list of addresses of the users of the first software structure;
    the means for creating the reference to the first software structure comprises:
    means for creating the reference to the first software structure to include an address of the first software structure for the second software structure; and
    the means for adding the reference comprises:
    means for adding the reference to the second software structure, the reference to the second software structure including an address of the second software structure, to the list of references to users of the first software structure.

15. A system according to claim 13, wherein:
    the means for creating the first software structure comprises:
    means for creating the first software structure to have the list of references to users include a list of names of the users of the first software structure;
    the means for creating the reference to the first software structure comprises:
    means for creating the reference to the first software structure to include a name of the first software structure for the second software structure; and
    the means for adding the reference comprises:
    means for adding the reference to the second software structure, the reference to the second software structure including a name of the second software structure, to the list of references to users of the first software structure.

16. A system according to claim 13, wherein:
    the means for creating a first software structure comprises:
    means for creating the first software structure to include a first software object which has the list of references to users of the first software structure; and
    the means for creating the reference to the first software structure comprises:
    means for creating the reference to the first software structure for a second software structure which includes a second software object.

17. A system according to claim 13, further comprising:

means for processing the list of references to users of the first software structure to obtain the reference to the second software structure; and means for setting the reference to the first software structure of the second software structure to indicate deletion of the first software structure using the reference to the second software structure obtained by the means for processing the list of references to users of the first software structure.

18. A system according to claim 17, further comprising:
means for deleting the first software structure.

19. A system according to claim 13, further comprising:
means for obtaining the list of references to users of the first software structure;

means for deleting the reference to the second software structure from the list of references to users of the first software structure; and means for deleting the second software structure.

20. A system according to claim 19, wherein:
the means for obtaining the list of references to users of the first software structure further comprises:

means for obtaining the reference to the first software structure of the second software structure; and means for obtaining the list of references to users of the first software structure using the reference to the first software structure which has been obtained.

21. A system according to claim 13, further comprising:
means for obtaining the list of references to users of the first software structure;

means for deleting the reference to the second software structure from the list of references to users of the first software structure; and means for modifying the reference to the first software structure of the second software structure to a modified reference value.

22. A system according to claim 21, wherein:
the means for obtaining the list of references to users of the first software structure further comprises:

means for obtaining the reference to the first software structure of the second software structure; and means for obtaining the list of references to users of the first software structure using the reference to the first software structure obtained by the means for obtaining the reference to the first software structure of the second software structure.

23. A system according to claim 13, further comprising:
means for creating a reference to the first software structure for a third software structure; and means for adding a reference to the third software structure to the list of references to users of the first software structure.

24. A system according to claim 23, further comprising:
means for processing the list of references to users of the first software structure to obtain the reference to the second software structure;

means for setting the reference to the first software structure of the second software structure to indicate deletion of the first software structure using the reference to the second software structure which has been obtained by the means for processing the list of references to users of the first software structure to obtain the reference to the second software structure;

means for processing the list of references to users of the first software structure to obtain the reference to the third software structure; and means for setting the reference to the first software structure of the third software structure to indicate deletion of the first software structure using the reference to the third software structure which has been obtained by the means for processing the list of references to users of the first software structure to obtain the reference to the third software structure.

25. A computer program product including a computer readable medium for managing references to software structures, comprising:

means for creating a first software structure having a list of references to users of the first software structure;

means for creating a reference to the first software structure for a second software structure; and means for adding a reference to the second software structure to the list of references to users of the first software structure.

26. A computer program product according to claim 25, wherein:

the means for creating the first software structure comprises:

means for creating the first software structure to have the list of references to users include a list of addresses of the users of the first software structure;

the means for creating the reference to the first software structure comprises:

means for creating the reference to the first software structure to include an address of the first software structure for the second software structure; and the means for adding the reference comprises:

means for adding the reference to the second software structure, the reference to the second software structure including an address of the second software structure, to the list of references to users of the first software structure.

27. A computer program product according to claim 25, wherein:

the means for creating the first software structure comprises:

means for creating the first software structure to have the list of references to users include a list of names of the users of the first software structure;

the means for creating the reference to the first software structure comprises:

means for creating the reference to the first software structure to include a name of the first software structure for the second software structure; and the means for adding the reference comprises:

means for adding the reference to the second software structure, the reference to the second software structure including a name of the second software structure, to the list of references to users of the first software structure.

28. A computer program product according to claim 25, wherein:

the means for creating a first software structure comprises:

means for creating the first software structure to include a first software object which has the list of references to users of the first software structure; and the means for creating the reference to the first software structure comprises:

means for creating the reference to the first software structure for a second software structure which includes a second software object.

29. A computer program product according to claim 25, further comprising:
    means for processing the list of references to users of the first software structure to obtain the reference to the second software structure; and
    means for setting the reference to the first software structure of the second software structure to indicate deletion of the first software structure using the reference to the second software structure obtained by the means for processing the list of references to users of the first software structure.

30. A computer program product according to claim 29, further comprising:
    means for deleting the first software structure.

31. A computer program product according to claim 25, further comprising:
    means for obtaining the list of references to users of the first software structure;
    means for deleting the reference to the second software structure from the list of references to users of the first software structure; and
    means for deleting the second software structure.

32. A computer program product according to claim 31, wherein:
    the means for obtaining the list of references to users of the first software structure further comprises:
    means for obtaining the reference to the first software structure of the second software structure; and
    means for obtaining the list of references to users of the first software structure using the reference to the first software structure which has been obtained.

33. A computer program product according to claim 25, further comprising:
    means for obtaining the list of references to users of the first software structure;
    means for deleting the reference to the second software structure from the list of references to users of the first software structure; and
    means for modifying the reference to the first software structure of the second software structure to a modified reference value.

34. A computer program product according to claim 33, wherein:
    the means for obtaining the list of references to users of the first software structure further comprises:
    means for obtaining the reference to the first software structure of the second software structure; and
    means for obtaining the list of references to users of the first software structure using the reference to the first software structure obtained by the means for obtaining the reference to the first software structure of the second software structure.

35. A computer program product according to claim 25, further comprising:
    means for creating a reference to the first software structure for a third software structure; and
    means for adding a reference to the third software structure to the list of references to users of the first software structure.

36. A computer program product according to claim 35, further comprising:
    means for processing the list of references to users of the first software structure to obtain the reference to the second software structure;
    means for setting the reference to the first software structure of the second software structure to indicate deletion of the first software structure using the reference to the second software structure which has been obtained by the means for processing the list of references to users of the first software structure to obtain the reference to the second software structure;
    means for processing the list of references to users of the first software structure to obtain the reference to the third software structure; and
    means for setting the reference to the first software structure of the third software structure to indicate deletion of the first software structure using the reference to the third software structure which has been obtained by the means for processing the list of references to users of the first software structure to obtain the reference to the third software structure.

37. A memory embodied in a computer for managing references to software structures comprising:
    a first software structure stored in the memory comprising:
        a list of references to users of the first software structure; and
    a second software structure stored in the memory comprising:
        a reference to the first software structure,
    wherein the list of references to users of the first software structure includes a reference to the second software structure.

38. A memory according to claim 37, wherein:
    the first software structure stored in the memory further comprises:
        a list of references to users of the first software structure which includes a list of addresses of the users of the first software structure; and
    the second software structure stored in the memory further comprises:
        a reference to the first software structure which includes an address of the first software structure,
    wherein the list of references to users of the first software structure includes a reference to the second software structure which includes an address of the second software structure.

39. A memory according to claim 37, wherein:
    the first software structure stored in the memory further comprises:
        a list of references to users of the first software structure which includes a list of names of the users of the first software structure; and
    the second software structure stored in the memory further comprises:
        a reference to the first software structure which includes a name of the first software structure,
    wherein the list of references to users of the first software structure includes a reference to the second software structure which includes a name of the second software structure.

40. A memory according to claim 37, wherein:
    the first software structure stored in the memory further comprises:
        a first software object which has the list of references to users of the first software structure; and
    the second software structure stored in the memory further comprises:
        a second software object which has the reference to the first software structure.

41. A memory according to claim 37, further comprising:

a third software structure stored in the memory comprising:
   a reference to the first software structure, wherein the list of references to users of the first software structure includes a reference to the third software structure.

42. An object-oriented system for managing references to software structures for implementation by a computer in an object-oriented framework, comprising:

a memory;

means for creating a first software structure in the memory having a list of references to users of the first software structure;

means for creating a reference to the first software structure for a second software structure in the memory; and means for adding a reference to the second software structure to the list of references to users of the first software structure in the memory, wherein at least one of the means for creating a first software structure, the means for creating a reference, the means for adding a reference, the first software structure, and the second software structure includes a software object.

43. A system according to claim 42, wherein the second software structure includes a software object derived from a base class having a reference pointer to the first software structure and the means for creating the reference to the first software structure further comprises:

means for creating a reference to the first software structure for the second software structure which includes a software object derived from a base class having a reference pointer to the first software structure.

44. A system according to claim 43, further comprising:

means for creating a reference to the first software structure for a third software structure; and means for adding a reference to the third software structure to the list of references to users of the first software structure.

45. A system according to claim 44, further comprising:

means for processing the list of references to users of the first software structure to obtain the reference to the second software structure;

means for setting the reference to the first software structure of the second software structure to indicate deletion of the first software structure using the reference to the second software structure which has been obtained by the means for processing the list of references to users of the first software structure to obtain the reference to the second software structure;

means for processing the list of references to users of the first software structure to obtain the reference to the third software structure; and means for setting the reference to the first software structure of the third software structure to indicate deletion of the first software structure using the reference to the second software structure which has been obtained by the means for processing the list of references to users of the first software structure to obtain the reference to the third software structure.

46. A system according to claim 43, further comprising:

means for processing the list of references to users of the first software structure to obtain the reference to the second software structure; and means for setting the reference to the first software structure of the second software structure to indicate deletion of the first software structure using the reference to the second software structure obtained by the means for processing the list of references to users of the first software structure.

47. A system according to claim 46, further comprising:

means for deleting the first software structure.

48. A system according to claim 47, further comprising:

means for obtaining the list of references to users of the first software structure;

means for deleting the reference to the second software structure from the list of references to users of the first software structure; and means for deleting the second software structure.

49. A system according to claim 48, further comprising:

means for modifying the reference to the first software structure of the second software structure to a modified reference value.

50. A system according to claim 49, wherein:

at least one of the means for creating a first software structure, the means for creating a reference to the first software structure for a second software structure, the means for adding a reference to the second software structure to the list of references to users of the first software structure, the means for processing the list of references to users of the first software structure to obtain the reference to the second software structure, the means for setting the reference to the first software structure of the second software structure to indicate deletion of the first software structure, the means for deleting the first software structure, the means for obtaining the list of references to users of the first software structure, the means for deleting the reference to the second software structure from the list of references to users of the first software structure, the means for deleting the second software structure, and the means for modifying the reference to the first software structure of the second software structure includes a software method.

* * * * *